United States Patent

Borzyak et al.

[11] 4,048,280
[45] Sept. 13, 1977

[54] METHOD OF MANUFACTURING ELECTROTECHNICAL ARTICLES

[76] Inventors: Jury Gordeevich Borzyak, Armyansky pereulok, 1/3, kv. 76; Alexandr Ivanovich Borisenko, prospekt Pravdy 7, kv. 274; German Mikhailovich Tjufilin, Moskovsky prospekt, 192/4, kv. 46; Alexandr Ivanovich Rolik, ploschad Teveleva 2/2, kv. 58; Alexandr Ivanovich Yakovlev, 601 mikroraion 23, kv. 54, all of Kharkov, U.S.S.R.

[21] Appl. No.: 181,413

[22] Filed: Sept. 17, 1971

[51] Int. Cl.² .................. B29C 15/00; B29D 7/10
[52] U.S. Cl. .................. 264/102; 264/138; 264/175; 264/236; 264/257
[58] Field of Search ............ 264/104, 111, 112, 113, 264/122, 142, 126, 143, 257, 146, 259, 102, 120, 25, 175, 236, 257; 310/43–45, 216, 217; 106/290

[56] References Cited

U.S. PATENT DOCUMENTS

| | | | |
|---|---|---|---|
| 2,164,058 | 6/1939 | Fowler | 264/146 |
| 2,330,590 | 9/1943 | Kaschke | 106/290 |
| 2,761,854 | 9/1956 | Coler | 264/104 X |
| 2,779,975 | 2/1957 | Lee et al. | 264/104 X |
| 2,963,746 | 12/1960 | Webb et al. | 264/126 |
| 3,032,462 | 5/1962 | Saporito | 264/257 |
| 3,044,151 | 7/1962 | Coler | 264/113 X |
| 3,059,278 | 10/1962 | Daniel | 264/102 |
| 3,166,615 | 1/1965 | Farrell | 264/111 X |
| 3,538,600 | 11/1970 | Farrell et al. | 264/104 |

Primary Examiner—Willard E. Hoag
Attorney, Agent, or Firm—Haseltine, Lake & Waters

[57] ABSTRACT

A method of manufacturing electrotechnical articles, preferably magnetic keys, from a magnetodielectric composition. The method comprises mixing together iron powder and a thermosetting resin containing a curing agent in vacuo in order to remove air inclusions and the volatile products of the thermosetting reaction; batching the resulting composition; rolling the batched composition to obtain flat sheet blanks of a thickness greater than that of finished products; molding and simultaneously pre-forming the sheets to obtain compacted blanks, and subjecting the blanks first to cold curing and thereafter to step-wise heat treatment.

4 Claims, 5 Drawing Figures

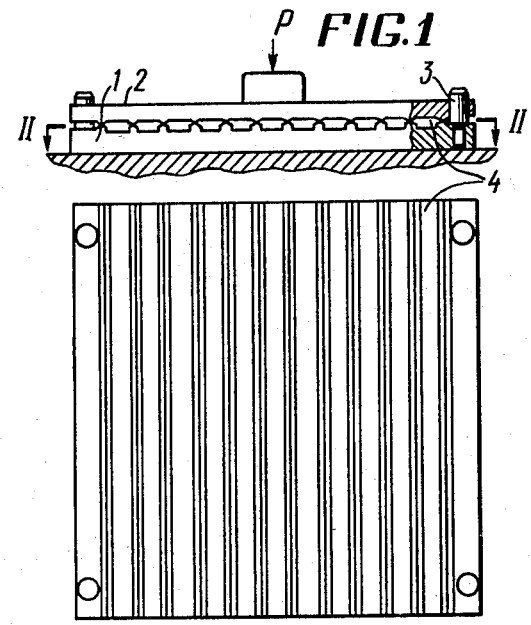
FIG.1
FIG.2
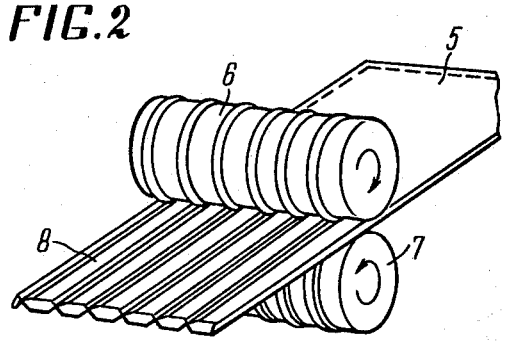
FIG.3
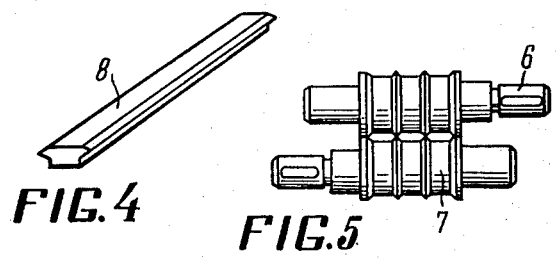
FIG.4  FIG.5

METHOD OF MANUFACTURING ELECTROTECHNICAL ARTICLES

This invention relates to electrical machine-building and, more specifically, to a method for the manufacture of electrotechnical articles from magnetodielectric composition, such as magnetic keys for electrical machines.

A method for the manufacture of electroctechnical articles from magnetodielectric composition will be described hereinafter with reference to the manufacture of magnetic keys. Magnetic keys are intended for minimizing pulsatory losses, winding heating and vibrations in electrical machines.

A variety of methods are currently available for the manufacture of magnetic keys, but essential limitations inherent in said prior art methods preclude their widespread use. Hollow magnetic keys made from steel are also well known in the art.

The principal disadvantage of hollow steel keys is low resistivity which necessitates applying onto the keys a thin insulating film (0.1-0.15 mm thick). However, said film is easily scratched off by stator components while the keys are being inserted into slots. The damaged insulating coating renders the magnetic keys inoperative, since in this instance a key becomes an open conductor, in which there will be induced an e.m.f. from the main magnetic field of a working electrical machine and the key in question will burn out as a result of short-circuiting to the stator iron. Hence, this type of magnetic key design lacks reliability, while the process of manufacturing said keys is laborious and expensive because of the necessity of checking the insulating coating of each key separately.

Steel keys also display an excessively high transverse magnetic permeability ($\mu_o$ = 500-1,000), this property being responsible for a marked increase of slot dispersion losses.

It is also known to employ magnetic keys assembled from electrical steel plates. Keys of this type, apart from being manufactured by a laborious method, are also disadvantageous in that they exhibit a high transverse magnetic permeability and, hence, increased losses due to magnetic flux slot dispersion. Said magnetic keys fail in the course of operation under the effect of alternating fields and vibrations, non-magnetic rivets which hold the steel plates together not being strong enough to withstand vibration effects.

Magnetic keys with directed ferromagnetic components are likewise known in the art, but have not found extensive application because of technological difficulties intrinsic in their large-scale production. Magnetic keys of this type are used only in special-purpose machines of a short service life. Said keys, like the magnetic keys from steel plates, are of low performance reliability. For example, magnetic keys made from metallic gauze sintered by a special technique between hardened paper or laminated fabric sheets have been found to shrink under service conditions and to undergo lamination under the effect of heat and vibration loads, followed by key crumbling out of slots.

It is further known to employ magnetic keys manufactured from iron and a bonding agent by the high-pressure technique. Said keys exhibit a low resistivity commensurate with that of electrical steel, thereby necessitating the application of insulating coats on the surface of such keys and also calling for measures to diminish slot dispersion losses. The keys in question are further disadvantageous, inasmuch as their manufacture involves a heavy initial outlay for the construction of high-pressure presses and calls for a sophisticated technique of insulation application onto each key separately.

Composite magnetic keys comprising a magnetic component and a central non-magnetic insert intended to minimize slot dispersion are also known in the art.

The process of manufacturing said composite keys is highly laborious, particularly in conjunction with mass production of small-size machines. Said keys are further disadvantageous in that their mechanical strength is low due to key lamination into the magnetic and the non-magnetic components.

As regards cermet keys manufactured by compression or sintering of iron powders and metal oxides by powder metallurgy techniques, mention should be made of the fact that said keys exhibit high conductivity and magnetic permeability, which properties result in high losses due to slot dispersion, an added disadvantage being a complicated molding technique involving pressures as high as 5,000-6,000 kg/cm$^2$.

The necessity of thoroughly insulating the key from the iron core, the laborious manufacturing process and a limited field of application (in large-size machines only) are the principal factors responsible for the practical absence of cermet key utilization in electrical machines.

It is an object of the present invention to eliminate or mitigate the aforementioned disadvantages.

It is another object of the present invention to provide a method for the manufacture of electrotechnical articles, primarily of magnetic keys, which insures high thermal resistance and mechanical strength, as well as improved magnetodielectric properties of the resultant electrochemical articles by resorting to a novel technology.

These objects are accomplished by a method for the manufacture of electrotechnical articles, preferably of magnetic keys, from a magnetodielectric mass comprising mixing together iron powder, a thermosetting resin and a curing agent in vacuo in order to remove air inclusions and volatile products, batching the resultant mix, molding blanks and subjecting the molded blanks to step-wise heat treatment in order to effect thermosetting resin curing wherein, according to the invention, said mix batches are rolled to obtain blanks in the form of smooth sheets having a thickness greater than that of finished articles, molding is accompanied by preforming with a view to compacting the blanks, and the blanks, prior to being subjected to step-wise heat treatment, are allowed to cure under natural conditions.

It is preferable to combine the operation of blank preforming with cutting the blank into strips and to effect blank molding, preforming and cutting by rolling on profiling rolls.

Blank molding, preforming and cutting can be expediently carried out in matched dies under a press, the process of blank moulding being effected simultaneously with reinforcing the blank surface with glass cloth.

The present invention may be used in electrical machine-building, since the electrotechnical articles such as, for example, magnetic keys manufactured by the method of the invention are noted for their superior magnetodielectric, thermal and strength characteristics, so that the employment of magnetic keys manufactured by the method of the invention in electrical machines improves substantially their performance characteristics.

Magnetic keys manufactured by the present method can be used in asynchronous and synchronous motors, as well as in direct current generators rated at 100 to 10,000 kW.

Numerous tests are indicative of a high degree of performance reliability inherent in the present magnetic keys, so that the employment of said magnetic keys in turbo- or hydrogenerator appears to be warranted.

Electrical machines, in which use is made of the magnetic keys manufactured by the method of the invention, exhibit superior weight and performance characteristics as compared to electrical machines having conventional non-magnetic keys, such as hardened paper keys, laminated fabric keys, and the like.

The employment of magnetic keys made from a ferromagnetic dielectric composition makes it possible to reduce the share of additional losses by 50–75% and to diminish overall heat losses by 15–25% depending upon the machine type, modification and speed.

Said beneficial effects result in increasing the efficiency of electrical machines by 1.5 to 2.5% and raising the power factor by 1–3 points, the average temperature of winding overheat being reduced by 8°–19° C, whereby the actual power of a machine is raised by 10 to 15%, the overall dimensions and weight of the machine being the same.

Electrotechnical articles from the magnetodielectric material, according to the present invention, are noted not only for their good magnetic and dielectric properties, but for outstanding performance characteristics as well. Absolute dependability of magnetic keys from said magnetodielectric material has been adequately demonstrated by a 4-year period of using 200–1,600 kW explosion-proof asynchronous motors under strenuous operating conditions in coal mines.

Hence, the present method combines technological effectiveness with operating economy, while the electrotechnical articles, particularly, magnetic keys manufactured in accordance with the method of the invention display the following advantageous properties: high flexure strength; adequate impact strength due to the fact that key ramming into a slot does not impair the key structure; the feasibility of relative magnetic permeability control; absence of eddy current losses; high resistivity $\rho$ (about $1 \times 10^6$ ohm.mm$^2$/m); good heat conduction, and a low linear expansion coefficient. The present method is adapted to be used for the manufacture of magnetic keys of any desired profile.

Two factors are responsible for the economical effect that accrues from the employment of present magnetic keys in explosion-proof asynchronous motors:

a. electric power economy as a result of an average machine efficiency increase of 1.5%, so that for an electric motor operating 5,000 hours per annum the economy of electric power per 100 kW of rated motor power would be 7,500 kW-hr;

b. a 10–12% diminution of the production cost of one kW of the motor power as a result of a decreased consumption of active materials.

The present invention is illustrated hereinbelow by the description of exemplary embodiments thereof with reference to the accompanying drawings wherein:

FIG. 1 shows a matched die for molding electrotechnical articles, according to the invention;

FIG. 2 is a plan view taken on line II—II in FIG. 1;

FIG. 3 shows the process of blank molding by the rolling technique, according to the invention;

FIG. 4 shows the finished magnetic key, according to the invention, and

FIG. 5 is an elevation view of the system of profiling rolls, according to the invention.

In the present method for the manufacture of electrotechnical articles, preferably of magnetic keys, the starting material is a magnetodielectric material whose composition is varied to meet the requirements imposed on the finished article by the contemplated service conditions. Given below are exemplary compositions of the magnetodielectric material for magnetic keys to be used in electrical machines of different power ratings.

EXAMPLE 1

For large electrical machines (power rating, 300 to 5,000 kW) the magnetic keys are manufactured from the following magnetodielectric composition.

The magnetodielectric composition is based on a furan-epoxide resin mixed with a curing agent, the magnetic component of the composition being iron powder having a grain size of from 1 to 50 mc.

In the magnetodielectric composition, the ingredients are present in the following proportions, parts by weight:

| | |
|---|---|
| 1) furan-epoxide resin | 100 |
| 2) curing agent (polyethylene-polyamine or hexamethylene-diamine) | 12 |
| 3) plasticizer (dibutyl phthalate) | 2 |
| 4) filler (iron powder; grain size, up to 50 mc): | |
|    a) for reinforced articles | 400 |
|    b) for non-reinforced articles | 300 |
| 5) glass cloth for reinforcing the surface of articles | |

EXAMPLE 2

The magnetodielectric composition for the manufacture of magnetic keys to be used in conjunction with 5,000 to 10,000 kW electrical machines comprises the following ingredients, parts by weight:

| | |
|---|---|
| 1) furan-epoxide resin | 100 |
| 2) curing agent (polyethylene-polyamine or hexamethylene-diamine) | 15 |
| 3) plasticizer (dibutyl phthalate) | 2 |
| 4) filler (iron powder; grain size, up to 50 mc) | 350 |

Magnetic keys for 5,000–10,000 kW machines need not be reinforced with glass cloth, since these large-size keys have adequate strength without reinforcement.

EXAMPLE 3

The magnetodielectric composition for the manufacture of magnetic keys to be used in 100–300 kW electrical machines comprises the following ingredients, parts by weight:

| | |
|---|---|
| 1) furan-epoxide resin | 100 |
| 2) curing agent (polyethylene-polyamine or hexamethylene-diamine) | 15 |
| 3) plasticizer (dibutyl phthalate) | 1.5 |
| 4) filler (iron powder; grain size, up to 50 mc) | 300 |

The magnetic keys of this type are reinforced with glass cloth to improve their mechanical strength.

The physical and mechanical characteristics of magnetic keys prepared from the magnetodielectric composition of an optimum composition (see Example 1) are as follows:

| | |
|---|---|
| Specific gravity | 3.8 g/cm$^3$ |
| Bending strength, kg/cm$^2$: | |
| a) non-reinforced keys | 900 – 1,100 |
| b) keys reinforced with glass cloth | 1,500 – 2,000 |
| Thermal stability of keys under service conditions, °C | 155 |
| Magnetic saturation, Gauss | (8 – 12) × 10$^3$ |
| Relative magnetic permeability | 8 |
| Resistivity, $\frac{ohm \cdot mm^2}{m}$ | 1 × 10$^7$ – 1 × 10$^9$ |
| Linear expansion coefficient, 1/°C | 5.6 × 10$^{-5}$ |
| Heat conduction coefficient, $\frac{W}{m \cdot °C}$ | 0.6 – 0.7 |
| Shrinkage coefficient, % | 0.5 – 1.0 |
| Moisture absorption | practically none |

The magnetodielectric composition, according to the present invention, resists the attack of solutions of salts, acids and alkalies and is also stable to alcohols, oils, kerosene, gasoline, Freon and the like.

The furan-epoxide resin blend used in the present magnetodielectric composition comprises 40–45% of furfural resin and 55–60% of epoxide resin.

Said resins are blended by mechanical mixing at a temperature of 100° C in the presence of maleic anhydride.

Epoxide resins are thermosetting materials which are incapable of spontaneous transition to the infusible and insoluble state, said properties being provided by using suitable reagents which react with free functional groups present in epoxies and bring about epoxide resin curing, i.e. the conversion of the epoxide resins thus treated to resitols, viz., solid, infusible resins noted for extensive cross-linking of the starting epoxide resin molecules. The cured products undergo no further conversions.

To cure the present furan-epoxide resin-based magnetodielectric composition, use is made of aliphatic amines, such as hexamethylenediamine or polyethylenepolyamines, hexamethylenediamine having the formula

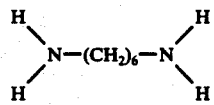

The reactive aminohydrogen atoms present in the curing agent molecule are capable of interacting with functional groups present in the epoxide resin in an amount of 14–16% by weight.

It will be noted that the process of epoxide resin curing after resin mixing with the curing agent (hexamethylenediamine or polyethylenepolyamine) proceeds at a high rate, even at an ambient temperature of 20°, and terminates within 15–20 minutes. The curing process is accompanied by vigorous heat evolution, whereby the reaction between the active hydrogen atoms of the curing agent and the functional groups of the epoxide resin is activated and results in complete three-dimensional cross-linking of the resin composition which immediately converts to the resitol-type state and will, therefore, be unsuitable for further processing.

A very short pot life (15–20 minutes) of epoxies precludes, despite their desirable dielectric and strength characteristics, the employment of said resins for the large-scale production of magnetic keys because of technological difficulties associated with so short a pot life.

Curing the epoxide resin with another curing agent, viz., methylhydrophthalic anhydride, is a two-stage high-temperature process, wherein the first stage (pre-curing) is carried out at a temperature of 80°–90° C for a period of from 6 to 8 hours, and the second stage (ultimate curing) is conducted at a temperature of 160°–180° C for 20–24 hours. Said formulation, which remains liquid at temperatures of up to 100° C, is unsuitable, from the standpoint of manufacturing process requirements, for the production of magnetic keys, inasmuch as article forming cannot be accomplished at normal ambient conditions and calls for prolonged heat treatment at high temperatures. These properties generally limit the uses, to which said formulation may be put, to impregnating and potting (casting) applications, e.g. encapsulation of electric motor units.

An epoxide resin-furfural resin blend is noted for its milder thermosetting characteristics, so that the overall process of formulation curing lends itself to control within the desired limits, and the pot life of the present magnetodielectric composition can be varied in the range of from 2 to 24 hours, said property being a highly beneficial factor in the mass production of magnetic keys.

The procedure employed for the preparation of the magnetodielectric composition to be used in the manufacture of magnetic keys is as follows.

Use is made of a commercial furan-epoxide resin blend stored at or preheated to 20°–25° C.

The magnetic component is commercial iron powder which should be dried, prior to use, in an oven at a temperature of 150°–130° C for a period of 1–1.5 hours with stirring. The iron powder should be free of lumps, rust and foreign materials, particularly organic impurities. If required, the iron powder can be screened through a fine sieve.

The curing agent is crystalline hexamethylenediamine. Prior to use, the crystalline curing agent should be molten on a water bath maintained at a temperature of 50°–60° and thereafter allowed to cool to 40° C.

The ingredients of the sought-for magnetodielectric composition are mixed in the following sequence. The requisite amount of the molten hexamethylenediamine having a temperature of 40° C is introduced into the furan-epoxide resin blend, followed by stirring the mixture for 10–15 minutes, preferably by means of a mechanical stirrer driven by an electric motor at a rate of 30–50 r.p.m.

Next, the requisite amount of iron powder, which has been dried and cooled to a temperature of 20°–25° C, is incorporated into the furan-epoxide resin- curing agent mix, followed by stirring thoroughly the resulting mixture for a period of 10–15 minutes.

Once the mixing steps (overall duration, from 20 to 30 minutes) have been completed, the resulting composition is subjected to evacuation (residual pressure, 1×10$^{-2}$–1×10$^{-3}$ mm mercury) for 40 to 60 minutes.

The magnetodielectric composition, when charged into a vacuum chamber, initially experiences marked swelling (a 2–3-fold increase in volume), then subsides and starts to boil vigorously. The end of evacuation manifests itself in gradual attenuation and ultimate cessation of boiling. During the evacuation step, the temperature of the composition should not exceed 35°–40° C and, if necessary, a system of vacuum chamber forced cooling should be actuated.

In the absence of proper temperature control, there might occur a vigorous exothermic reaction and spontaneous temperature rise to 100° C. Under said conditions, the process of composition curing will atomatically proceed from the first curing stage, viz., slow curing, to the second stage, at which there occurs complete and irreversible curing.

The thus-evacuated composition is batched and allowed to undergo cold cure (the first curing stage) until the requisite composition viscosity is attained, followed by processing said composition into magnetic keys or other electrotechnical articles.

The next step consists in rolling the composition batches, e.g. rolling on smooth rolls, to obtain blanks in the form of smooth sheets having a thickness somewhat greater than the requisite thickness of the finished articles.

To form magnetic keys from the smooth sheet blanks, recourse may be had to either the matched die pressure molding technique (FIGS. 1, 2) or to the rolling technique wherein smooth sheets from the present magnetodielectric composition after a cold cure for a period of 12–18 hours are rolled on profiling rolls.

The former technique calls for the employment of matched metal dies with milled grooves to obtain the keys of the desired size.

The matched metal die (FIGS. 1 and 2) comprises a bottom plate 1 and a top plate 2 with guide pins 3 to set said plates in coincidence.

Grooves 4 for key molding are milled in the dies in the longitudinal direction, the die length (from 300 to 500 mm) being selected to obtain, provided cutting allowance equals 10–15%, an integral number of keys from the molded strip.

The quality of magnetic keys depends upon the surface finish of the grooves 4 in the die, machining the die to a high grade of quality being pertinent.

Prior to charging the composition into the mold, the grooves 4 should be lubricated with solid oil or TsIA-TIM grease in order to provide for the easy release of formed keys from the mold and also to prevent the die surface from contamination.

Onto the bottom plate 1 is placed the top plate 2 and the following specific pressure is applied to the die depending upon the desired thickness of the magnetic keys being molded:

| magnetic key thickness, mm | specific pressure, kg/cm$^2$ |
| --- | --- |
| up to 3 | 40 – 50 |
| 3–6 | 50 – 100 |
| 6–10 | 100 – 150 |

The moulding time equals 10–15 minutes. It is practicable to stack as many as 10 dies in a press to effect simultaneous molding.

After the molding step, the magnetic keys are left in the closed dies in order effect ultimate cold curing for a period of 12–15 hours (a longer curing period is not contraindicated).

The number of available dies should preferably correspond to twice the daily consumption of magnetic keys, so as to use one set of dies for molding a lot of magnetic keys, while the other set of dies is employed for heat treating the preceding lot of magnetic keys. Under these conditions, high quality characteristics of magnetic keys are warranted, but in exceptional cases it is permissible to extract molded keys, prior to the step of curing, from the dies by means of a comb-like lifter made from a sheet material 1–1.5 mm thick. In this instance, the uncured keys are to be placed on level sheets in order to avoid longitudinal or transverse distortions of the key profile. This operation requires the employment of one set of dies only.

Key molding in matched metal dies is noted for its outstanding simplicity, has moderate floor space and minimum labor requirements. These advantageous features are attained by rolling the batched composition on smooth rolls to obtain flat sheets having a thickness greater than that of the finished articles and by subjecting said blanks to molding comprising pre-forming the blanks and imparting thereto the desired geometrical shape, the steps of blank cutting into strips and reinforcing with glass cloth being conducted simultaneously in said dies.

To manufacture magnetic keys of a small sectional area (10–15 mm wide and up to 5 mm thick), use is made of the rolling technique on profiling rolls (FIGS. 3, 4 and 5).

Here the steps of magnetodielectric composition preparation and sheet blank production are identical to those employed in the aforedescribed matched die pressure molding technique, but the step of key forming comprises passing sheet blanks 5 through profiling rolls 6 and 7 driven either mechanically or manually and automatically cutting a continuous key strip 8 that leaves the rolls 6 and 7 to requisite lengths by a guillotine (not shown in the drawings).

The cut keys 8 are transferred by a belt conveyer onto strictly planar sheets and undergo thereon preliminary cold curing for a period of 12 to 18 hours, followed by subjecting the pre-cured keys to step-wise heat treatment.

The rolling technique of magnetic key manufacture is distinct from the matched die pressure molding technique in that the process of key forming is somewhat simpler, inasmuch as the necessity of manufacturing appropriate dies is obviated, the use of presses is dispensed with, and the separate step of key strip cutting is avoided. However, said technique involves additional difficulties associated with maintaining the transverse and longitudinal rectilinearity of the as yet uncured keys, said requirement necessitating the use of auxiliary guides and straightening arrangements.

The magnetic keys, on being molded by either of the aforedescribed techniques, are subjected to the following heat treatment in order to bring about the ultimate polymerization of the magnetodielectric composition.

The keys contained in the dies or placed on sheets are charged into an air-drying cabinet, in which provision, is made for the uniform circulation of hot air. In case the magnetic keys to be heat treated lie on sheets, care should be exercised in avoiding any type of sectional area distortions in said keys.

The temperature in the air-drying cabinet is uniformly and steadily raised to 180°–200° C for a period of 1–2 hours and thereafter maintained at said level for 2–2.5 hours by means of a thermoregulator, whereupon the cabinet is deenergized and allowed to cool to ambient temperature, the cabinet doors being closed.

Deviations from the prescribed conditions of heat treatment, be it the ultimate temperature or the dwell time, might result in either "green" keys, in which the process of thermosetting has not come to completion, or in overcured, excessively hard keys when the temperature of heat treatment was too high, so that the strength characteristics of finished products would be impaired.

The magnetic keys manufactured from the magnetodielectric composition, according to the invention, display the following distinctive features:

1. EFFICIENCY a. The magnetic keys from the present magnetodielectric composition make it possible to drastically reduce additional losses in electrical machines by 50–70%, whereby the heating of electrical machine working parts is decreased by 8°–19° C, the power factor is increased by 2–3 points, and the efficiency improved by 1–2% for large-size machines of up to 5,000 kW in capacity or by 2–4% for the machines of up to 100 kW in capacity.

b. The actual power produced per one kg of the machine weight is increased by 12–15%, the overall dimensions of the machine remaining constant.

c. The employment of magnetic keys in direct current machines is also conducive to a substantial improvement of vibroacoustic characteristics of said machines. Spectrograms of vibration accelerations and noise are indicative of magnetic vibration decrease in the 1,000–2000 Hz range by 16–18 db and of noise decrease by 6–8 db.

2. RELIABILITY

The reliability of articles manufactured from the magnetodielectric composition by the method of the invention is provided for by good heat distortion temperature and vibration strength. Available experimental and performance data make it possible to guarantee the following service life of articles from the magnetodielectric composition for diverse classes of heat resistance

| Class of insulation | Heat distortion temperature, ° C | Guaranteed service life, hours |
|---|---|---|
| A, E and B | up to 130 | unlimited |
|  | up to 155 | 80,000 |
| H | up to 180 | 20,000 |

The method of the present invention is useful for the manufacture of not only magnetic keys, but also of other electrotechnical articles such as, for example, diverse magnetic shunts, rotor and stator cores, cores of starters for various lighting fixtures, cores for the electromagnetic contactors in control systems, and the like.

We claim:

1. A method for the manufacture of electrotechnical articles, such as magnetic core members for electrical machines, from a magnetodielectric composition which comprises mixing together iron powder and a thermosetting resin containing a curing agent in vacuo to remove air inclusions and thermosetting reaction volatile products; batching the resulting composition; rolling the batched composition to obtain flat sheet blanks having a thickness greater than that of finished articles; molding and simultaneously pre-forming said sheets to obtain compacted blanks; and curing said blanks first under natural conditions and thereafter by step-wise heat treatment.

2. A method for the manufacture of electrotechnical articles of claim 1 wherein blank pre-forming is accompanied by simultaneous blank cutting into strips.

3. A method for the manufacture of electrotechnical articles of claim 1 wherein molding, pre-forming and cutting the blank is effected on profiling rolls.

4. A method for the manufacture of electrotechnical articles of claim 1 wherein molding, pre-forming and cutting the blanks is carried out by the pressure molding technique in matched profiling dies, blank surface reinforcement with glass cloth being effected in the course of blank molding.

* * * * *